United States Patent
Kim et al.

(10) Patent No.: US 12,548,851 B2
(45) Date of Patent: Feb. 10, 2026

(54) SEPARATOR COATING MATERIALS FOR RECHARGEABLE BATTERIES

(71) Applicant: Rivian IP Holdings, LLC, Irvine, CA (US)

(72) Inventors: Soo Kim, Fremont, CA (US); Sookyung Jeong, San Jose, CA (US); Tae Kyoung Kim, Sunnyvale, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 894 days.

(21) Appl. No.: 17/856,003

(22) Filed: Jul. 1, 2022

(65) Prior Publication Data

US 2024/0006720 A1    Jan. 4, 2024

(51) Int. Cl.
| | |
|---|---|
| *H01M 50/449* | (2021.01) |
| *H01M 10/0525* | (2010.01) |
| *H01M 50/403* | (2021.01) |
| *H01M 50/417* | (2021.01) |
| *H01M 50/429* | (2021.01) |
| *H01M 50/434* | (2021.01) |
| *H01M 50/457* | (2021.01) |
| *H01M 50/491* | (2021.01) |
| *H01M 50/494* | (2021.01) |

(52) U.S. Cl.
CPC ..... *H01M 50/449* (2021.01); *H01M 10/0525* (2013.01); *H01M 50/403* (2021.01); *H01M 50/417* (2021.01); *H01M 50/4295* (2021.01); *H01M 50/434* (2021.01); *H01M 50/457* (2021.01); *H01M 50/491* (2021.01); *H01M 50/494* (2021.01)

(58) Field of Classification Search
CPC ............. H01M 50/457; H01M 50/403; H01M 50/449; H01M 50/491; H01M 50/494; H01M 50/446
See application file for complete search history.

(56) References Cited

U.S. PATENT DOCUMENTS

| 7,901,830 B1* | 3/2011 | Gerald, II | H01M 50/414 |
|---|---|---|---|
| | | | 429/251 |
| 2016/0006009 A1* | 1/2016 | Kim | B29C 55/14 |
| | | | 429/246 |
| 2018/0212220 A1* | 7/2018 | Kuratani | H01M 50/451 |
| 2021/0273268 A1* | 9/2021 | Yu | H01M 10/4235 |
| 2022/0069419 A1* | 3/2022 | Han | H01M 4/623 |

OTHER PUBLICATIONS

Pu, "Rose-like vanadium disulfide coated by hydrophilic hydroxyvanadium oxide with improved electrochemical performance as cathode material for aqueous zinc-ion batteries", 2019, Journal of Power Sources, 437, https://doi.org/10.1016/j.jpowsour.2019.226917 (Year: 2019).*

* cited by examiner

*Primary Examiner* — Nicholas A Smith
*Assistant Examiner* — Ziheng Lu
(74) *Attorney, Agent, or Firm* — Foley & Lardner LLP

(57) ABSTRACT

A coated separator for a rechargeable battery includes a porous polymer sheet comprising a surface; and a coating disposed on the surface, the coating comprising a metal oxyhydroxide; wherein: the coating includes a greater HF score when normalized to that of AlO(OH) at 100%; a greater $PF_5^-$ score when normalized to that of AlO(OH) at 100%; or a greater LiOH score when normalized to that of AlO(OH) at 100%; or a combination of any two or more thereof.

20 Claims, 8 Drawing Sheets

SEPARATOR COATING MATERIALS FOR RECHARGEABLE BATTERIES

INTRODUCTION

The present disclosure relates to coating materials including a metal oxyhydroxide (MO(OH)), useful in secondary rechargeable batteries.

A metal oxyhydroxide (MO(OH))-based ceramic coated separator for rechargeable secondary lithium-ion battery (LIB) to maximize stability. This ceramic coated separator overcomes some of the limitations of polyethylene (PE) and polypropylene (PP) separators, such as low thermal stability. The ceramic coating may be single- or double-sided on the porous polymer sheet, facing anode and/or cathode electrodes in the LIBs.

SUMMARY

Polymer-based films are used as separators in Li-ion batteries, where in some types of batteries the separator may directly contact the positive and negative electrodes (i.e., cathode and anode). Commercial separators, typically polyethylene and polypropylene, have high porosity and sufficient mechanical and electrochemical stabilities during normal battery operations. However, in the case of cell degradation and/or failure modes, such as internal short and thermal runaway, a polymer-based separator alone may not have sufficient thermal stability, due to low melting point. To accommodate some of disadvantages of pure polymer-based separators, agents to increase thermal stability may be introduced. One of mostly used ceramic coatings include $SiO_2$, $Al_2O_3$, and AlO(OH). These ceramic-coated separators (CCSs) are frequently utilized for the development of safer battery cells, especially for electric vehicles (EVs). These ceramic-based coatings help to improve thermal stability and electrolyte wettability.

The present technology addresses the current need for ceramic coatings with properties superior to the current state of the art. In an aspect, a coated separator is provided that includes a porous polymer sheet with a coating on at least part of a surface of the porous polymer sheet, where the coating includes metal oxyhydroxide (MO(OH)) and includes one or more of the following: a greater HF score when normalized to that of AlO(OH) at 100%; a greater $PF_5^-$ score when normalized to that of AlO(OH) at 100%; or a greater LiOH score when normalized to that of AlO(OH) at 100%. Thus, the coatings described herein provide equivalent or superior protection to that of AlO(OH).

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The phrase "and/or" as used in the present disclosure will be understood to mean any one of the recited members individually or a combination of any two or more thereof—for example, "A, B, and/or C" would mean "A, B, C, A and B, A and C, B and C, or the combination of A, B, and C."

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Polymer-based films are used as separators in Li-ion batteries, where in some types of batteries the separator may directly contact the positive and negative electrodes (i.e., cathode and anode). Lithium ions may be transported through a separator while preventing the cathode and anode from contacting each other to avoid short circuit of the cell. Commercial separators, typically polyethylene and polypropylene, have high porosity and sufficient mechanical and electrochemical stabilities during normal battery operations. However, in the case of cell degradation and/or failure modes, such as internal short and thermal runaway, a polymer-based separator alone may not have sufficient thermal stability, due to low melting point. Another design consideration involves liquid electrolyte "wetting" process on the polymer-based separators.

Figure 1:
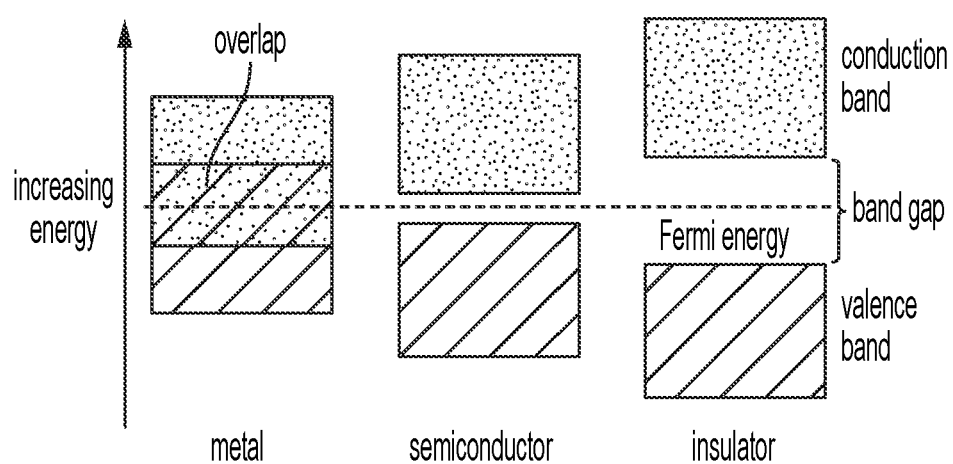
FIG. 1 provides a diagram illustrating band gap differences at room temperature between conductors (e.g., metals), semiconductors, and insulators.

Ceramic-based coating materials may be used to improve the performance of polymer-based separators, particularly when subjected to heat stress. Commonly used ceramic coatings include $SiO_2$, $Al_2O_3$, and AlO(OH). These ceramic-coated separators are frequently used in battery cells, especially battery cells for use in electric vehicles. These ceramic-based coatings are helpful to improve thermal stability and electrolyte wettability, which can be verified using shrinkage test at elevated temperature and electrolyte soaking test, respectively. Ceramic coatings for a separator must show an insulating nature, not to directly involve in charge transfer reactions between the electrode materials. By definition, a bandgap refers to the energy difference between the top of valence band and the bottom of conduction band in semiconductors and insulators. In other words, it is the energy required to promote valence electron to the conduction band. For example, at room temperature metal has a zero bandgap (i.e., overlap between valence and conduction band); therefore, electron transfer requires no barrier (i.e., conducting), as shown in FIG. 1. A semiconductor behaves as an insulator but has a narrower band gap, allowing thermal excitation of electrons to jump from one band to another. Typically, semiconductors have the bandgap range of 0.5 to 1.5 eV. A material with a large bandgap is an insulator (e.g., >1.5 eV), which electric current does not flow freely unless a large external energy (e.g., >1.5 eV) is applied to the material system. In the contrast, a semimetal (e.g., 0<bandgap <0.5 eV) requires less energy to allow the excitation of electrons.

The present technology addresses the current need for ceramic coatings with properties superior to the current state of the art.

Thus, in an aspect, a coated separator is provided that includes a porous polymer sheet with a coating on at least part of a surface of the porous polymer sheet, where the coating includes metal oxyhydroxide (MO(OH)) and includes one or more of the following: a greater HF score when normalized to that of AlO(OH) at 100% (e.g. up to a score of about 275%); a greater $PF_5^-$ score when normalized to that of AlO(OH) at 100% (e.g. up to a score of about 210%); or a greater LiOH score when normalized to that of AlO(OH) at 100% (for example, a LiOH score of 100% for a material indicates the material is as stable as AlO(OH) against LiOH). Thus, the coatings described herein provide equivalent or superior protection to that of AlO(OH). In any embodiment herein, the coating may be a ceramic coating. The MO(OH) included in the coating may be a single crystal, polycrystalline, or blended (e.g., different size of single crystals, polycrystals, or mixture of single- and polycrystals).

As used herein, the HF, $PF_5^-$, and LiOH scores are determined based upon the model reaction that is to be run, as discussed in the working examples. For example, the molar ratio of components (HF or $PF_5^-$) to MO(OH) is first determined (ratio 1). The ratio is then normalized to the ratio for the baseline reaction of AlO(OH) by dividing ratio 1 (for AlO(OH)) by ratio 1 (for the MO(OH) of interest) to arrive at value 2. The enthalpy of reaction ($E_{rxn}$) in eV/atom is then determined from the calculation, however this is then normalized to the $E_{rxn}$ for AlO(OH) dividing the $E_{rxn}$ (for the MO(OH) of interest) by $E_{rxn}$ (for AlO(OH)) to arrive at value 2. Value 1 and 2 are then summed, however they are based upon molar ratios. To convert the values to weight-based values, the sum is then divided by the molecular weight of the MO(OH) multiplied by 1000. The $PF_5^-$ or HF score is then determined by dividing the per weight value for the AlO(OH) by the per weight value of the MO(OH) multiplied by 100. Expressed another way, the $PF_5^-$ or HF score is a percentage improvement (or diminution) for that reaction compared to the baseline AlO(OH) value. Illustrative calculations are shown in the examples.

The coating of any embodiment herein may include ScO(OH), VO(OH), FeO(OH), GaO(OH), MnO(OH), InO(OH), or a mixture of any two or more thereof. The coating of any embodiment herein may include a mixture of (i) $SiO_2$, $Al_2O_3$, and/or AlO(OH); and (ii) ScO(OH), VO(OH), FeO(OH), GaO(OH), MnO(OH), and/or InO(OH). In any embodiment herein, the coating may include ScO(OH), VO(OH), or a mixture of any two or more thereof as well as $SiO_2$, $Al_2O_3$, and/or AlO(OH). In any embodiment herein, an average thickness of the coating may be about 0.1 μm to about 15 μm. Thus, in any embodiment disclosed herein, the coating may be at a thickness of about 0.1 μm, about 0.5 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, or any range including and/or in between any two of these values.

Figure 3:
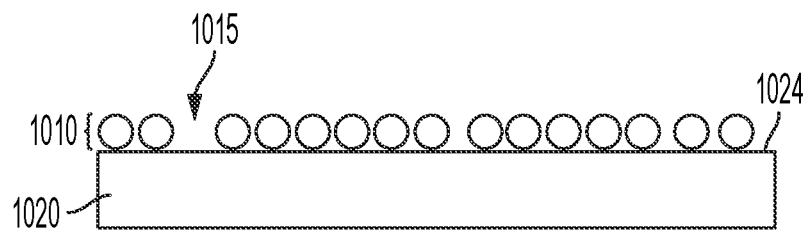
FIG. 3 is a schematic illustration of various embodiments of the coated separators of the present technology, as discussed in the present disclosure.

In any embodiment herein, the coating may be a particulate material (e.g., nano-sized powders). The morphology of such particulate material may take on a variety of shapes—for example, it may be spherical, ovoid, rod-like, disc-shaped, star-shaped, rectangular, ellipsoidal, and the like, and may be determined experimentally by the use of scanning electron microscopy (SEM). In any embodiment herein, the coating may include voids, gaps, and/or other irregularities on the surface of the porous polymer sheet (e.g., gaps and/or voids between particulate material). In any embodiment herein, the coating (e.g., a ceramic coating) may be porous—for example, where the coating is a particulate material, the coating may be porous depending on the packing of particulate material (e.g., ceramic powder materials). In any embodiment herein, a portion of the coating may have a greater thickness than other portions of the coating. Referring to FIG. 3, in some embodiments the coating 1010 is a porous particulate coating on the surface 1024 of the porous polymer sheet 1020. In FIG. 3, the depicted morphology of the particulate material of coating 1010 is purely for ease of representation and not to be considered limiting. It is understood that in the commercial coating of the porous polymer sheet, commercial coating materials may include voids (e.g., void 1015 depicted in FIG. 3) and other irregularities on the surface of the porous polymer sheet. In general, in any embodiment herein, the coating may have a greater porosity as determined by mercury porosimetry than the porous polymer sheet, and thus facilitate Li+ ion transport through the coated separator. As the coating material is deposited onto the porous polymer sheet, it may nucleate, e.g., near grain boundaries of the porous polymer sheet.

In any embodiment herein, the coating may include two or more layers (e.g., a multilayer coating), where at least one layer (a "first layer") includes $SiO_2$, $Al_2O_3$, AlO(OH), or a mixture of any two or more thereof; and at least another layer (a "second layer") includes ScO(OH), VO(OH), FeO(OH), GaO(OH), MnO(OH), InO(OH), or a mixture of any two or more thereof. In any embodiment herein where the coating includes two or more layers, a layer on the surface of the porous polymer sheet (the "initial layer") may include voids and/or other irregularities on the surface of the porous polymer sheet. As an additional layer is deposited the initial layer, materials of the additional layer may nucleate near grain boundaries of the initial layer, and/or may fill the voids or uncoated areas left by the initial layer and grow in thickness in those areas as the deposition proceeds. Where the additional layer is deposited on top of the initial layer, the additional layer may be thinner (e.g., to reduce overall electrical resistance).

Figure 4:
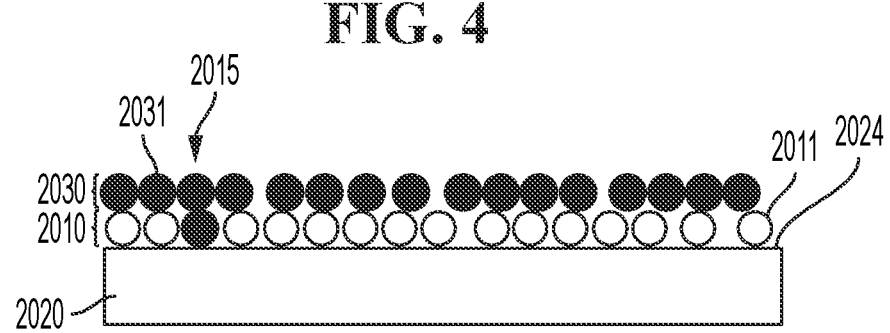
FIG. 4 is a schematic illustration of various embodiments of the coated separators of the present technology that include a first coating material layer and a second coating material layer, as discussed in the present disclosure.

Referring to FIG. 4, in some embodiments, the coating may include a first coating material layer 2010 of a first particulate coating material 2011 on a surface 2024 of the porous polymer sheet 2020 and a second coating material layer 2030 of a second particulate coating material 2031. The depicted morphology of the first particulate coating material 2011 and the second particulate coating material 2031 is purely for ease of representation and not to be considered limiting. The first coating material layer 2010 may include void region 2015 of the first particulate coating material 2011 on the porous polymer sheet 2020, and where a portion of the second coating material layer 2030 may be formed in the void region 2015 and have a greater thickness of the second particulate coating material 2031 than other portions of the second coating material layer 2030. Although not depicted in FIG. 4, a portion of the second coating material layer 2030 may be formed over void regions 2015 of the first coating material (see, e.g., FIG. 6 at region 4015, FIG. 7 at region 5015 and region 5045, discussed herein). The first coating material layer 2010 may include ScO(OH), VO(OH), FeO(OH), GaO(OH), MnO(OH), InO(OH), or a mixture of any two or more thereof and the second coating material layer 2030 may include $SiO_2$, $Al_2O_3$, AlO(OH), or a mixture of any two or more thereof, where first coating material layer 2010 may optionally further include $SiO_2$, $Al_2O_3$, AlO(OH), or a mixture of any two or more thereof in an amount of about 0.01 wt. % to about 99.99 wt. % based on the total weight of the first coating material layer 2010. Alternatively, the first coating material layer 2010 may include $SiO_2$, $Al_2O_3$, AlO(OH), or a mixture of any two or more thereof and the second coating material layer 2030 may include ScO(OH), VO(OH), FeO(OH), GaO(OH), MnO(OH), InO(OH), or a mixture of any two or more thereof, where second coating material layer 2030 may optionally further include $SiO_2$, $Al_2O_3$, AlO(OH), or a mixture of any two or more thereof in an amount of about 0.01 wt. % to about 99.99 wt. % based on the total weight of the second coating material 2030.

In any of the above embodiments, the second coating material layer may overcoat or nucleate at the first coating material layer, fill in voids of the first coating material layer on the surface of the porous polymer sheet, or both overcoats the first coating material layer and fill in voids of the first coating material layer on the surface of the porous polymer sheet, and the second coating material layer may be different from the first coating material layer. The first coating material layer and/or second coating material layer may be a single crystal, polycrystalline, or blended (e.g., different size of single crystals, polycrystals, or mixture of single- and polycrystals), where the first and/or second coating material layer may be different based on the size, morphology, and/or crystallinity.

It is understood that in the commercial coating of the porous polymer sheet, commercial (e.g., the first) coating material layers include voids and/or other irregularities on the surface of the porous polymer sheet. As the second coating material layer is deposited, the second coating materials typically nucleate near grain boundaries of the first coating material layer and/or the porous polymer sheet—for example, they may deposit on the porous polymer sheet next to the first coating material layer. They may also then fill the voids or uncoated areas from the first coating deposition and grow in thickness in those areas as the deposition proceeds. Where the second coating material layer is deposited on top of the first coating material, the second coating material layer may be thinner (e.g., such as illustrated in FIG. 4 for the regions of second coating material layer 2030 that are not in region 2015). The first coating material layer may be formed on the surface of the porous polymer sheet, and the second coating material layer may be formed in the void regions of the first coating material layer. A portion of the second coating material layer formed in the void regions of the first coating material layer may have a greater thickness than other portions of the second coating material layer formed as an overcoating.

The porous polymer sheet may include cellulose, polyethylene, polypropylene, or a combination of any two or more thereof; in any embodiment herein, the porous polymer sheet may include a polymer film. The porous polymer sheet of any embodiment herein may include a porosity as determined by mercury porosimetry of about 30% to about 80%; thus, the porous polymer sheet may include a porosity (as determined by mercury porosimetry) of about 30%, about 35%, about 40%, about 45%, about 50%, about 55%, about 60%, about 65%, about 70%, about 75%, about 80%, or any range including and/or in between any two of these values. The porous polymer sheet of any embodiment herein may include pore sizes as determined by mercury porosimetry of about 20 nm to about 80 nm. The porous polymer sheet of any embodiment herein may include a machine direction tensile strength (MD tensile strength) of about 1,000 kgf/cm² to about 2,500 kgf/cm².

In any embodiment herein, it may be that the surface of the porous polymer sheet is a first surface of the porous polymer sheet, where the porous polymer sheet includes the first surface and a second surface opposite the first surface, and optionally an edge surface (e.g., four edge surfaces for a quadrilateral polymer sheet). The porous polymer sheet of any embodiment herein may include a thickness (e.g., between the first surface and the second surface) of about 3 μm to about 40 μm; thus, in any embodiment herein, the porous polymer sheet may have a thickness of about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 µm, about 18 µm, about 19 µm, about 20 µm, about 22 µm, about 24 µm, about 26 µm, about 28 µm, about 30 µm, about 32 µm, about 34 µm, about 36 µm, about 38 µm, about 40 µm, or any range including and/or in between any two of these values.

In any embodiment herein, the coated separator may further include a coating disposed on the above-described second surface of the porous polymer sheet (a "second coating"). The second coating may, in any embodiment herein, be the same or different composition as the first coating. Without being bound by theory, it may be beneficial to have a second coating of a different composition than the first coating—for example, when included in an electrochemical device with a cathode and an anode, to have a different functionality between the cathode and the porous polymer sheet than between the anode and the porous polymer sheet. In such embodiments, the coating between the cathode and the porous polymer may help with thermal runaway, electrolyte stability at high voltage, improving wetting, and/or preventing chemical decomposition(s); and/or the coating between the cathode and the porous polymer may help with SEI formation, increasing protection against lithium dendrite (e.g., during fast charge), and/or other advantages. The second coating, in any embodiment herein and independently of the coating on the first surface, may include one or more of the following: a greater HF score when normalized to that of AlO(OH) at 100% (e.g. up to a score of about 275%); a greater $PF_5^-$ score when normalized to that of AlO(OH) at 100% (e.g. up to a score of about 210%); or a greater LiOH score when normalized to that of AlO(OH) at 100%. In any embodiment herein, the second coating may be a ceramic coating. In any embodiment herein, the coating may be a particulate material (e.g., nano-sized powders). In any embodiment herein, the coating may include voids, gaps, and/or other irregularities on the surface of the porous polymer sheet (e.g., gaps and/or voids between particulate material). In any embodiment herein, the coating (e.g., a ceramic coating) may be porous—for example, where the coating is a particulate material, the coating may be porous depending on the packing of particulate material (e.g., ceramic powder materials). The second coating of any embodiment herein may include ScO(OH), VO(OH), FeO(OH), GaO(OH), MnO(OH), InO(OH), or a mixture of any two or more thereof. The second coating of any embodiment herein may include a mixture of (i) $SiO_2$, $Al_2O_3$, and/or AlO(OH); and (ii) ScO(OH), VO(OH), FeO(OH), GaO(OH), MnO(OH), and/or InO(OH). In any embodiment herein, an average thickness of the second coating may be about 0.1 µm to about 15 µm; thus, in any embodiment disclosed herein, the second coating may be at a thickness of about 0.1 µm, about 0.5 µm, about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, or any range including and/or in between any two of these values.

Figure 5:
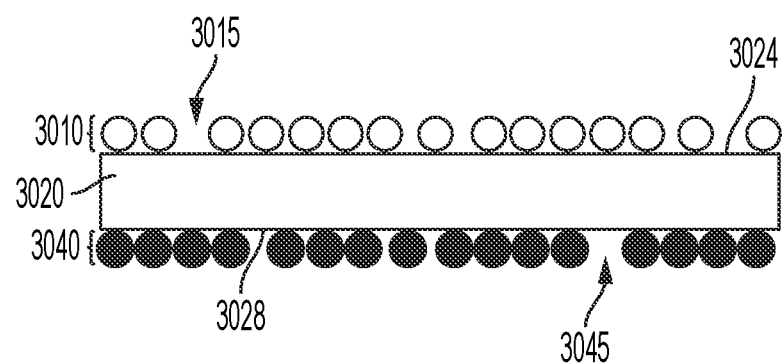
FIG. 5 is a schematic illustration of various embodiments of the coated separators of the present technology that include a coating on a first surface of a porous polymer sheet as well as a coating on a second surface of the porous polymer sheet, as discussed in the present disclosure.

For example, referring to FIG. 5, in some embodiments the first coating 3010 is a single coating material layer on the first surface 3024 of the porous polymer sheet 3020 and the second coating 3040 is a single coating material layer on the second surface 3028 of the porous polymer sheet 3020. The depicted morphology of the coating materials of each layer is purely for ease of representation and not to be considered limiting. Still referring to FIG. 5, in some embodiments the first coating 3010 may include void regions 3015 of coating on the porous polymer sheet 3020 and/or the second coating 3040 may include void regions 3045 of coating on the porous polymer sheet 3020. As discussed earlier in this disclosure, it is understood that in the commercial coating of the porous polymer sheet, commercial coating materials may include voids and/or other irregularities on the surface of the porous polymer sheet.

Figure 6:
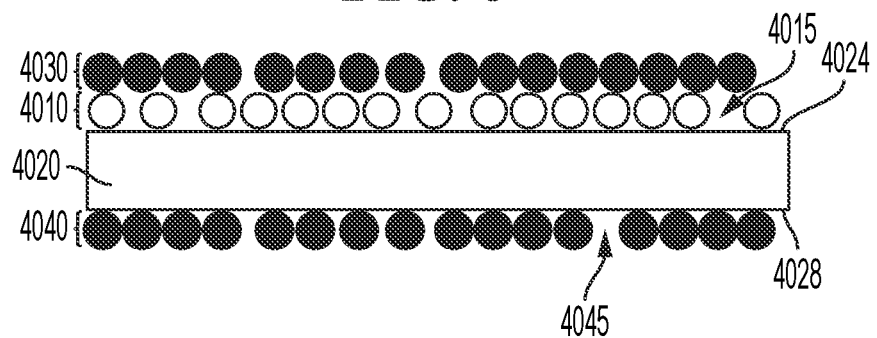
FIG. 6 is a schematic illustration of various embodiments of the coated separators of the present technology that include a first coating with a first coating material layer and a second coating material layer and a second coating that is a single layer of material, as discussed in the present disclosure.

Referring to FIG. 6, in some embodiments, the first coating may include a first coating material layer 4010 on the first surface 4024 of the porous polymer sheet 4020 and a second coating material layer 4030, and the second coating 4040 is a single coating material layer on the second surface 4028 of the porous polymer sheet 4020. The depicted morphology of the coating materials of each layer is purely for ease of representation and not to be considered limiting. The first coating material layer 4010 may include void region 4015 on the porous polymer sheet 4020, and where a portion of the second coating material layer 4030 is formed over the void region 4015 of the first coating material. In some embodiments (not depicted in FIG. 6), a portion of the second coating material layer 4030 is formed in the void regions 4015 of the first coating material 4010 and has a greater thickness than other portions of the coating formed as an overcoating (see e.g., FIG. 4 and region 2015). The second coating 4040 may include void regions 4045 of coating on the porous polymer sheet 4020. The first coating material layer 4010 may include ScO(OH), VO(OH), FeO(OH), GaO(OH), MnO(OH), InO(OH), or a mixture of any two or more thereof and the second coating material layer 4030 may include $SiO_2$, $Al_2O_3$, AlO(OH), or a mixture of any two or more thereof, where first coating material layer 4010 may optionally further include $SiO_2$, $Al_2O_3$, AlO(OH), or a mixture of any two or more thereof in an amount of about 0.01 wt. % to about 99.99 wt. % based on the total weight of the first coating material layer 2010. Alternatively, the first coating material layer 4010 may include $SiO_2$, $Al_2O_3$, AlO(OH), or a mixture of any two or more thereof and the second coating material layer 4030 may include ScO(OH), VO(OH), FeO(OH), GaO(OH), MnO(OH), InO(OH), or a mixture of any two or more thereof, where second coating material layer 4030 may optionally further include $SiO_2$, $Al_2O_3$, AlO(OH), or a mixture of any two or more thereof in an amount of about 0.01 wt. % to about 99.99 wt. % based on the total weight of the second coating material 4030. In any embodiment, the second coating 4040 may include $SiO_2$, $Al_2O_3$, AlO(OH), ScO(OH), VO(OH), FeO(OH), GaO(OH), MnO(OH), InO(OH), or a mixture of any two or more thereof.

In any embodiment herein, the second coating may include two or more layers (e.g., a multilayer coating). In any embodiment herein, the second coating may include at least one layer that includes $SiO_2$, $Al_2O_3$, AlO(OH), or a mixture of any two or more thereof; and at least another layer that includes ScO(OH), VO(OH), FeO(OH), GaO(OH), MnO(OH), InO(OH), or a mixture of any two or more thereof.

Figure 7:
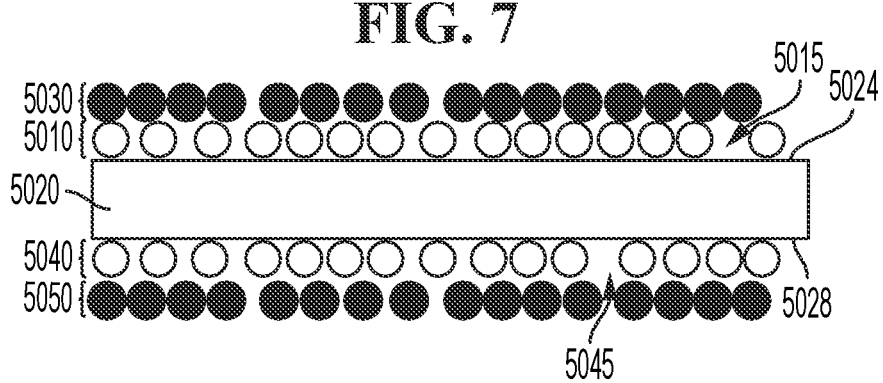
FIG. 7 is a schematic illustration of various embodiments of the coated separators of the present technology that include a first coating with a first coating material layer and a second coating material layer and a second coating with two layers of coating material, as discussed in the present disclosure.

For example, referring to FIG. 7, in some embodiments, the first coating may include a first coating material layer 5010 on the first surface 5024 of the porous polymer sheet 5020 and a second coating material layer 5030, and a second coating may include a third coating material layer 5040 on the second surface 5028 of the porous polymer sheet 5020 and a fourth coating material layer 5050. The depicted morphology of the coating materials of each layer is purely for ease of representation and not to be considered limiting. The first coating material layer 5010 may include void regions 5015 of coating on the porous polymer sheet 5020, and where a portion of the second coating material layer 5030 is formed over the at least some void regions 5015 of the first coating material. In some embodiments (not depicted in FIG. 7), a portion of the second coating material layer 5030 is formed in at least some void regions 5015 of the first coating material 5010 and has a greater thickness than other portions of the second coating material layer formed as an overcoating (see e.g., FIG. 4 and region 2015). The first coating material layer 5010 may include ScO(OH), VO(OH), FeO(OH), GaO(OH), MnO(OH), InO(OH), or a mixture of any two or more thereof and the second coating material layer 5030 may include $SiO_2$, $Al_2O_3$, AlO(OH), or a mixture of any two or more thereof, where first coating material layer 5010 may optionally further include $SiO_2$, $Al_2O_3$, AlO(OH), or a mixture of any two or more thereof in an amount of about 0.01 wt. % to about 99.99 wt. % based on the total weight of the first coating material layer 5010. Alternatively, the first coating material layer 5010 may include $SiO_2$, $Al_2O_3$, AlO(OH), or a mixture of any two or more thereof and the second coating material layer 5030 may include ScO(OH), VO(OH), FeO(OH), GaO(OH), MnO(OH), InO(OH), or a mixture of any two or more thereof, where second coating material layer 5030 may optionally further include $SiO_2$, $Al_2O_3$, AlO(OH), or a mixture of any two or more thereof in an amount of about 0.01 wt. % to about 99.99 wt. % based on the total weight of the second coating material 5030. The third coating material layer 5040 may include void regions 5045 of coating on the porous polymer sheet 5020, and where as depicted in FIG. 7 a portion of the fourth coating material layer 5050 may be formed over at least some void regions 5045 of the third coating material. In other embodiments (not depicted in FIG. 7), a portion of the fourth coating material layer 5050 is formed in at least some void regions 5045 of the first coating material 5040 and has a greater thickness than other portions of the coating formed as an overcoating (see e.g., FIG. 4 and region 2015). The third coating material layer 5040 may include ScO(OH), VO(OH), FeO(OH), GaO(OH), MnO(OH), InO(OH), or a mixture of any two or more thereof and the fourth coating material layer 5050 may include $SiO_2$, $Al_2O_3$, AlO(OH), or a mixture of any two or more thereof, where third coating material layer 5040 may optionally further include $SiO_2$, $Al_2O_3$, AlO(OH), or a mixture of any two or more thereof in an amount of about 0.01 wt. % to about 99.99 wt. % based on the total weight of the third coating material layer 5040. Alternatively, the third coating material layer 5040 may include $SiO_2$, $Al_2O_3$, AlO(OH), or a mixture of any two or more thereof and the fourth coating material layer 5050 may include ScO(OH), VO(OH), FeO(OH), GaO(OH), MnO(OH), InO(OH), or a mixture of any two or more thereof, where fourth coating material layer 5050 may optionally further include $SiO_2$, $Al_2O_3$, AlO(OH), or a mixture of any two or more thereof in an amount of about 0.01 wt. % to about 99.99 wt. % based on the total weight of the fourth coating material 5050.

Alternatively, or in addition, to the coated separator, a metal oxyhydroxide may be coated or deposited on other surfaces within a battery cell or within a battery pouch or within a battery housing. Accordingly, in another aspect, a metal oxyhydroxide (including ScO(OH), VO(OH), FeO(OH), GaO(OH), MnO(OH), InO(OH), or a mixture of any two or more thereof) may be included as a coating on a current collector, on the separator, inside a pouch, or inside a housing such that the coating can provide thermal protection for the battery system.

For example, in another aspect, a current collector includes a metal that is at least partially coated with a metal oxyhydroxide ("MO(OH) coating"). In any embodiment herein, the MO(OH) coating may include one or more of the following: a greater HF score when normalized to that of AlO(OH) at 100% (e.g. up to a score of about 275%); a greater $PF_5^-$ score when normalized to that of AlO(OH) at 100% (e.g. up to a score of about 210%); or a greater LiOH score when normalized to that of AlO(OH) at 100%. In any embodiment herein, the MO(OH) coating may be a ceramic coating. In any embodiment herein, MO(OH) coating may include ScO(OH), VO(OH), FeO(OH), GaO(OH), MnO(OH), InO(OH), or a mixture of any two or more thereof. In any embodiment herein, the MO(OH) coating may include a mixture of (i) $SiO_2$, $Al_2O_3$, and/or AlO(OH); and (ii) ScO(OH), VO(OH), FeO(OH), GaO(OH), MnO(OH), and/or InO(OH).

The current collector may include a metal that is aluminum, copper, nickel, titanium, stainless steel, or carbonaceous materials. The metal of the current collector may be in the form of a metal foil. For example, the current collector may be an aluminum (Al) or copper (Cu) foil. The current collector may be a metal alloy, made of Al, Cu, Ni, Fe, Ti, or combination of any two or more thereof. In any embodiment herein, the metal foils may be coated with carbon: e.g., carbon-coated Al foil, and the like.

The materials described herein are all intended for use in electrochemical devices such as, but not limited to, lithium ion batteries. Accordingly, in another aspect, the present technology provides an electrochemical cell, such as a lithium ion battery (e.g., a lithium secondary battery), that includes a cathode including a cathode active material and a coated separator of any embodiment disclosed herein. In any embodiment herein, the coating of the coated separator may be disposed toward the cathode or between the separator and the cathode; in any embodiment herein, the coating of the coated separator may be in contact with the cathode. Where the electrochemical cell is a lithium ion battery, the lithium ion battery may also optionally include an anode, a current collector, an electrolyte, a housing, or a combination of any two or more thereof. The housing may be a pouch in which a battery cell is contained, or it may be the housing the battery in which the pouches are contained. In the lithium ion battery, one or more of the anode, the current collector, or an inner surface of the housing may be at least partially coated with a metal oxyhydroxide, such as ScO(OH), VO(OH), FeO(OH), GaO(OH), MnO(OH), InO(OH), or a mixture of any two or more thereof.

The anodes of the electrochemical cells may include lithium. The electrochemical cell of any embodiment herein may include a current collector (e.g., Cu foil) with an in situ-formed anode (e.g., Li metal) on a surface of the current collector facing the separator or solid-state electrolyte such that in an uncharged state, the assembled cell does not comprise an anode active material.

Illustrative cathode active materials include materials such as lithium nickel manganese cobalt oxide ("LiNMC"), lithium nickel manganese oxide, lithium cobalt oxide (LCO), $Li(Ni_aCo_bAl_c)O_2$, $Li(Ni_dCo_eMn_fAl_g)O_2$, $Li(Mn_\alpha Ni_\beta)_2O_4$, or mixtures of any two or more thereof, where $a+b+c=1$, $d+e+f+g=1$ and $\alpha+\beta=1$. In any embodiment herein, the cathode active material may include $Li(Ni_aMn_bCo_c)O_2$, wherein $0 \leq a \leq 1$, $0 \leq b \leq 1$, $0 \leq c \leq 1$, and $a+b+c=1$. In any embodiment herein, the cathode active material may include $Li(Ni_aMn_bCo_c)O_2$, wherein $0<a<1$, $0<b<1$, $0<c<1$, and $a+b+c=1$. In any embodiment herein, the cathode active material may include $LiCoO_2$, $Li(Ni_aMn_bCo_c)O_2$, $Li(Mn_\alpha Ni_\beta)_2O_4$, or a mixture of any two or more thereof, wherein $a+b+c=1$, and $\alpha+\beta=1$. In any embodiment herein, the cathode active material may include $LiCoO_2$, Li(Ni$_a$Mn$_b$Co$_c$)O$_2$, Li(Mn$_\alpha$Ni$_\beta$)$_2$O$_4$, or a mixture of any two or more thereof, wherein 0<a<1, 0≤b<1, 0≤c<1, a+b+c=1, 0≤α<1, 0<β<1, and α+β=1. The cathode active material of any embodiment herein may be a nickel-rich cathode active material. As used herein nickel-rich cathodes are cathode active materials including 70 wt % or greater of nickel. This may include materials with greater than 80 wt % nickel. In any embodiment herein, the cathode may include LiFePO$_4$, LiMn$_{1-x}$FePO$_4$, LiM$^1$O$_2$, Li$_{1+x}$M$^2{}_{1-x}$O$_2$, or a mixture of any two or more thereof, where independently at each occurrence 0≤x≤1 and where M$^1$ and M$^2$ are each independently Ni, Co, Mn, or Al.

The cathodes and anodes may also each include, independently of each other, other materials such as conductive carbon materials, current collectors, binders, and other additives. Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The current collector may include a metal that is aluminum, copper, nickel, titanium, stainless steel, or carbonaceous materials. In any embodiment herein, the metal of the current collector may be in the form of a metal foil. For example, the current collector may be an aluminum (Al) or copper (Cu) foil. In any embodiment herein, the current collector may include a metal alloy, e.g., made of Al, Cu, Ni, Fe, Ti, or combination of any two or more thereof. The metal foils of any embodiment herein may be coated with carbon: e.g., carbon-coated Al foil and the like.

In another aspect, the present disclosure provides a process of manufacturing a coated separator of any embodiment disclosed herein useful, e.g., in lithium ion batteries or components associated with lithium ion batteries. The process includes mixing a metal oxyhydroxide and optionally a binder in a solvent to form a slurry, coating the slurry onto a surface of a porous polymer sheet, and removing the solvent to provide the coated separator. The mixing may be performed at ambient or elevated temperature, and the mixing may include a residence time of about 5 minutes to about 72 hours prior to the coating step. The mixing may include a milling step; alternatively, the mixing step may be performed subsequent to a milling step of the metal oxyhydroxide and/or one or more metal oxyhydroxide precursors. The solvent used in the slurry formation may be an alcohol (e.g., methanol, ethanol, isopropanol, or a mixture of any two or more thereof), a ketone (e.g., acetone), an ether, a heterocyclic ketone, and/or water (e.g., distilled water). One illustrative solvent is N-methylpyrrolidone ("NMP"). The solvent may be removed by allowing the solvent to evaporate at ambient or elevated temperature, or at ambient pressure or reduced pressure.

Illustrative optional binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials may include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

The solvent used in the mixing step may be an alcohol (e.g., methanol, ethanol, isopropanol, or a mixture of any two or more thereof), a ketone (e.g., acetone), an ether, a heterocyclic ketone, and/or water (e.g., distilled water). One illustrative solvent is N-methylpyrrolidone ("NMP"). Removing the solvent may be performed by allowing the solvent to evaporate at ambient and/or elevated temperature, and/or at ambient pressure, and/or under reduced pressure.

The coating step may include coating via a high-speed coater, optionally connected to a separator feeder and unwinding machine. The coating step may need to take place under anhydrous conditions and/or conducted under an inert atmosphere (N$_2$, He, Ar, etc.); alternatively, the coating step may include higher humidity conditions (e.g., to facilitate the dispersion and processing) followed by a separate drying step prior to or concurrent with removing the solvent.

In another aspect, the present disclosure provides a battery pack comprising the coated separator, the electrochemical cell, or the lithium ion battery of any one of the above embodiments. The battery pack may find a wide variety of applications including but are not limited to general energy storage or in vehicles.

Figure 8:
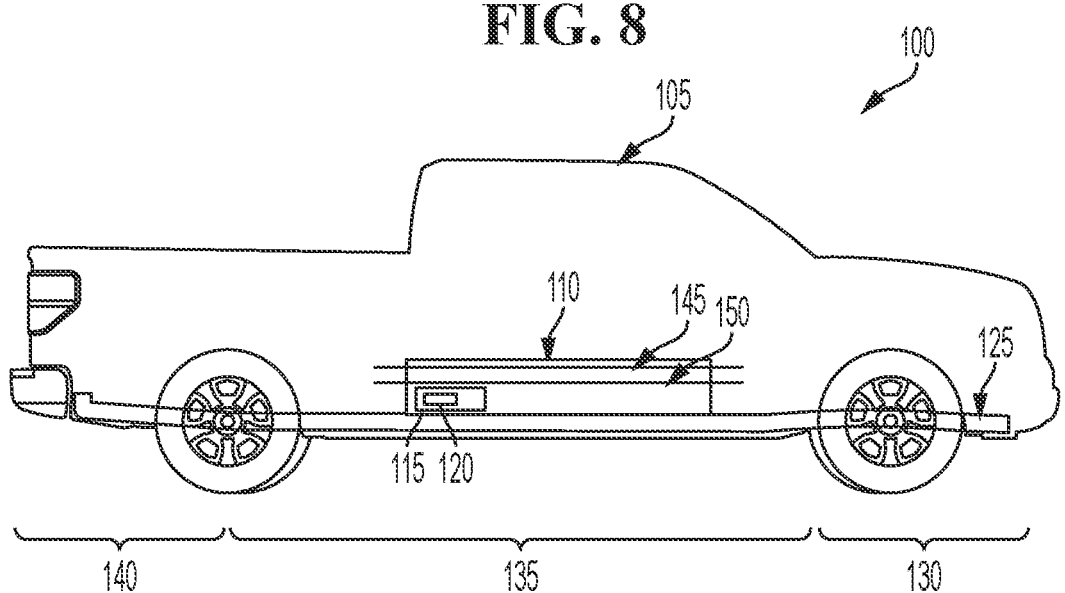
FIG. 8 is an illustration of a cross-sectional view of an electric vehicle, according to various embodiments.

In another aspect, a plurality of battery cells as described above may be used to form a battery and/or a battery pack that may find a wide variety of applications such as general storage, or in vehicles. By way of illustration of the use of such batteries or battery packs in an electric vehicle, FIG. 8 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 9:
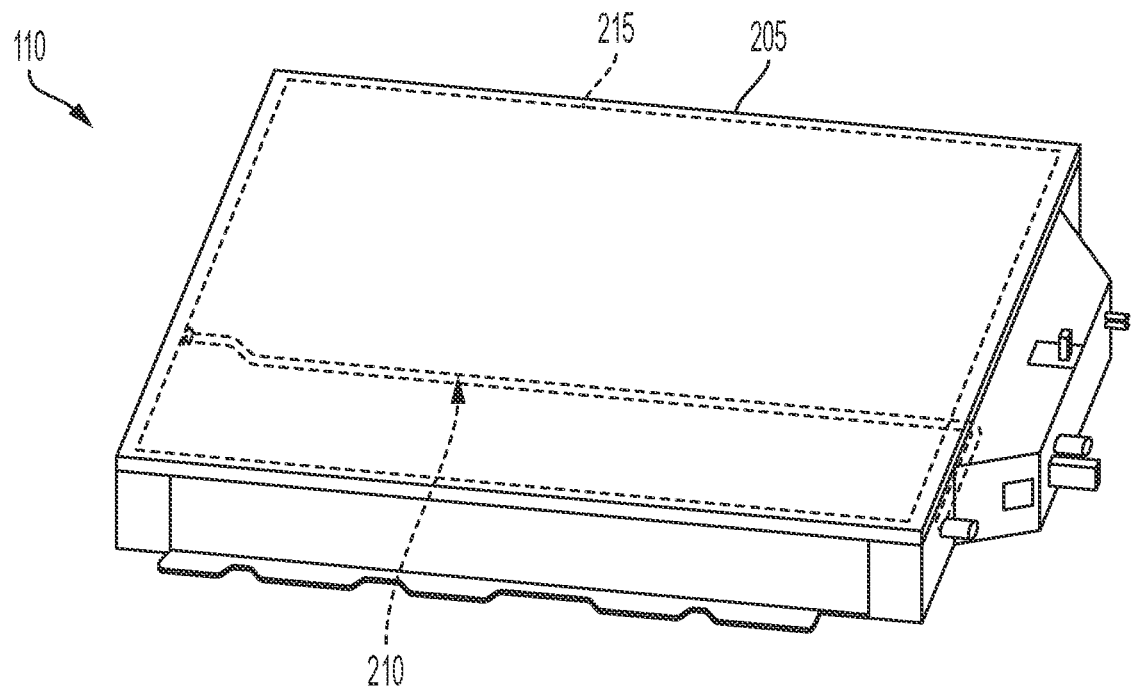
FIG. 9 is a depiction of an illustrative battery pack, according to various embodiments.

FIG. 9 depicts an example battery pack 110. Referring to FIG. 8 among others, the battery pack 110 can provide power to electric vehicle 105. Battery packs 110 can include any arrangement or network of electrical, electronic, mechanical, or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 10:
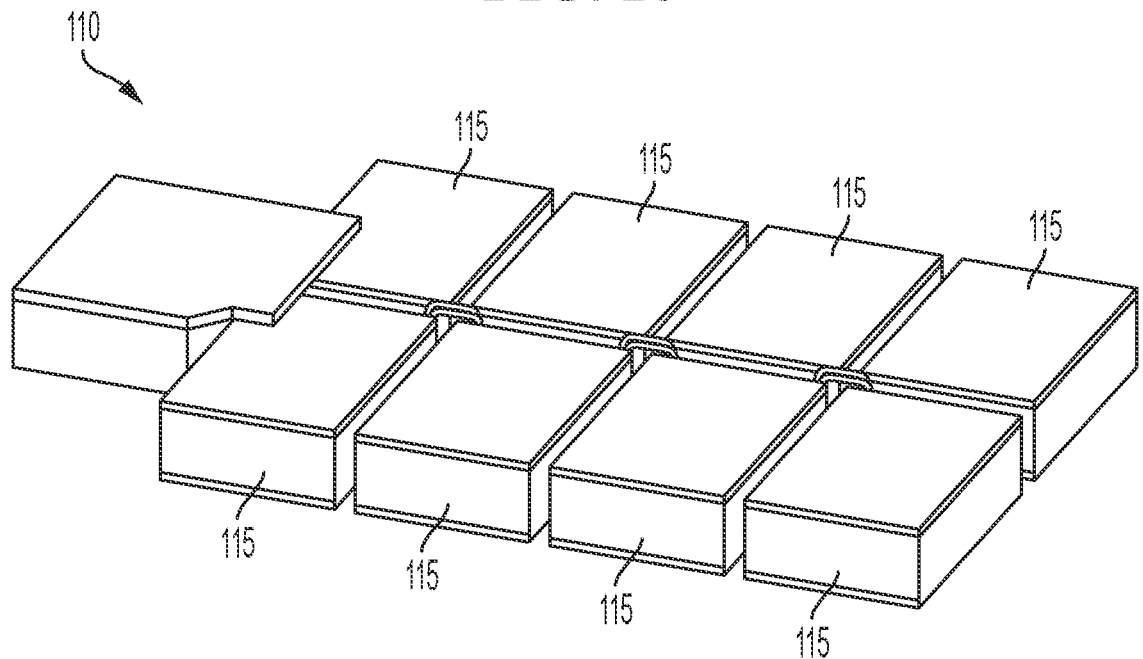
FIG. 10 is a depiction of an illustrative battery module, according to various embodiments.
Figure 11:
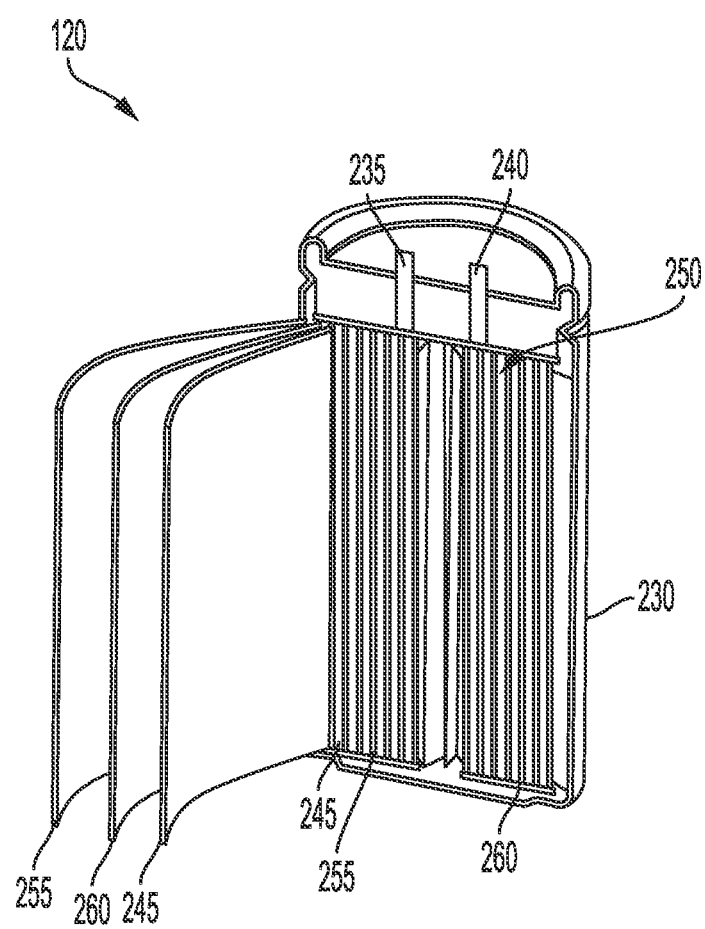
FIGS. 11, 12, and 13 are cross sectional illustrations of various batteries, according to various embodiments.

FIG. 10 depicts example battery modules 115, and FIG. 11 depicts an illustrative cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells (e.g., FIG. 11) or prismatic cells (e.g., FIG. 12), for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Figure 12:
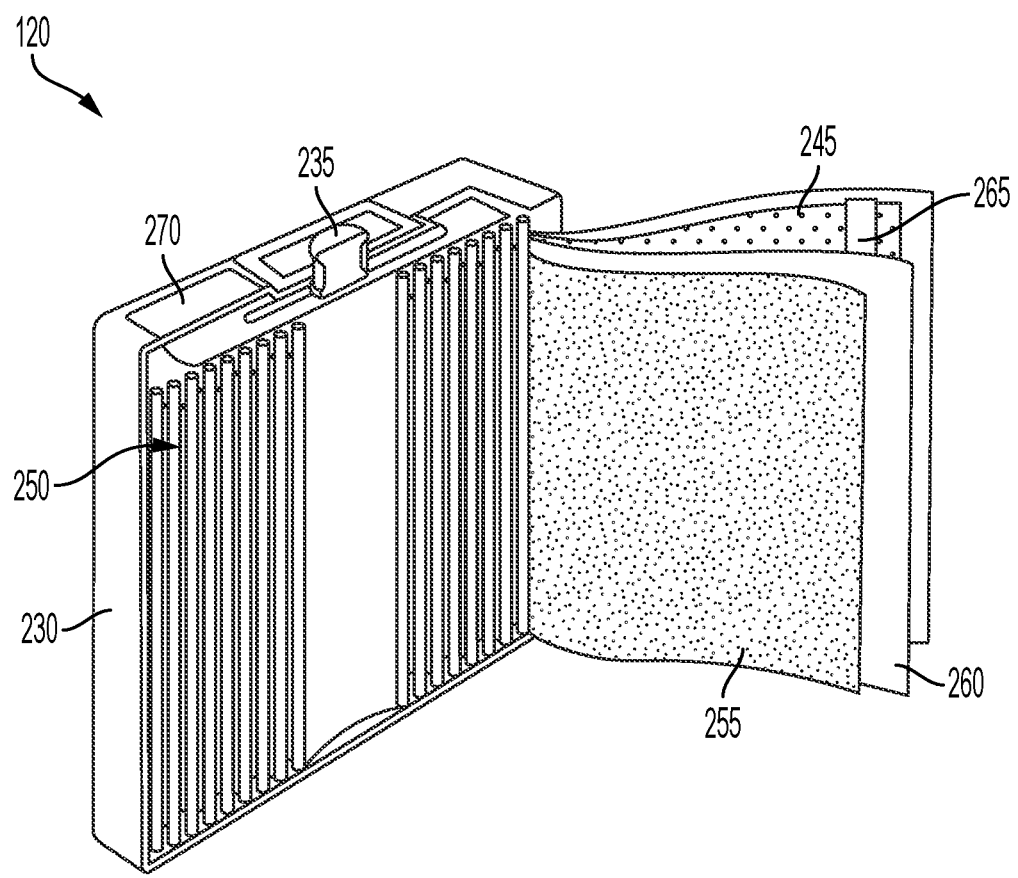
Figure 13:
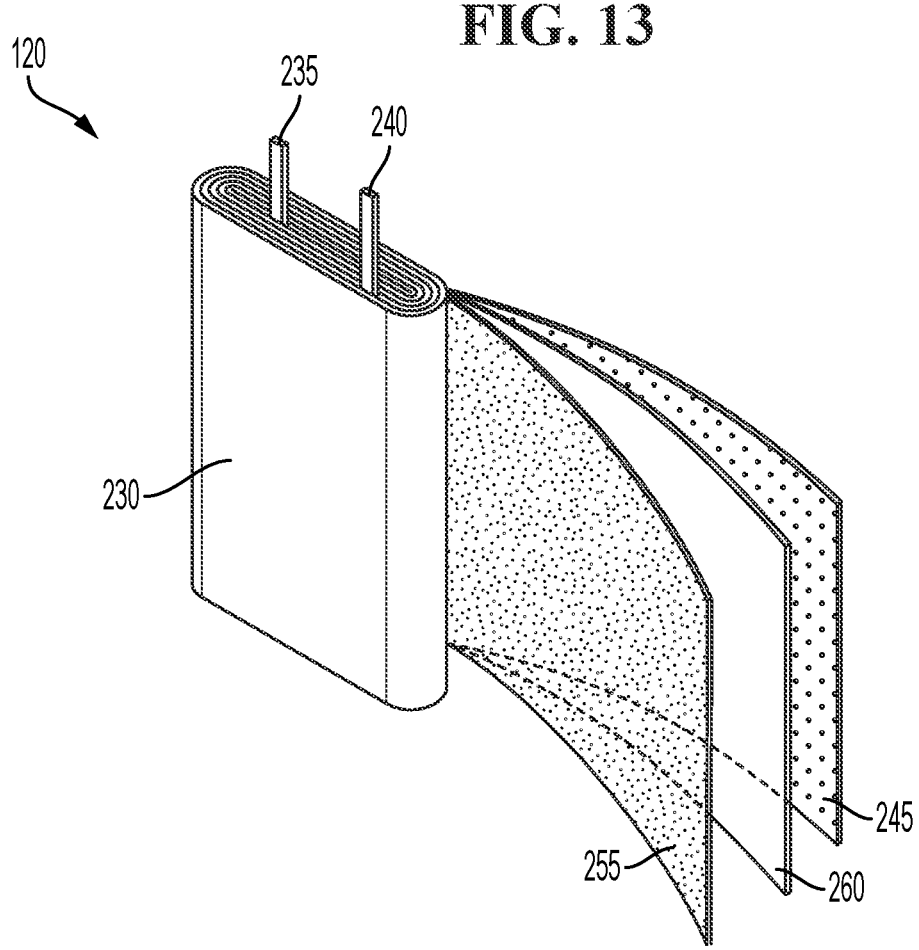

As noted above, battery cells 120 have a variety of form factors, shapes, or sizes. For example, battery cells 120 may have a cylindrical, rectangular, square, cubic, flat, or prismatic form factor. FIGS. 11, 12, and 13 depict illustrative cross sectional views of battery cells 120 in such various form factors. For example, FIG. 11 is a cylindrical cell, FIG. 12 is a prismatic cell, and FIG. 13 is the cell for use in a pouch. The battery cells 120 may be assembled by inserting a wound or stacked electrode roll (e.g., a jellyroll) including a separator (e.g., polymeric sheet) or electrolyte material (e.g., solid state electrolyte) into at least one battery cell housing 230. The electrolyte material, e.g., an ionically conductive fluid or other material, may generate or provide electric power for the battery cell 120. In an embodiment, the separator is wetted by a liquid electrolyte during a liquid electrolyte filling operation after insertion of the jellyroll. A first portion of the electrolyte material may have a first polarity, and a second portion of the electrolyte material may have a second polarity. The housing 230 may be of various shapes, including cylindrical or rectangular, for example. Electrical connections may be made between the electrolyte material and components of the battery cell 120. For example, electrical connections with at least some of the electrolyte material may be formed at two points or areas of the battery cell 120, for example to form a first polarity terminal 235 (e.g., a positive or anode terminal) and a second polarity terminal 240 (e.g., a negative or cathode terminal). The polarity terminals may be made from electrically conductive materials to carry electrical current from the battery cell 120 to an electrical load, such as a component or system of the electric vehicle 105.

The battery cell 120 can be included in battery modules 115 or battery packs 110 to power components of the electric vehicle 105. In any embodiment of the present technology, the battery pack (e.g., battery pack 110) may or may not include a battery module (e.g., battery module 115). By way of an example of a battery pack that does not include a battery module, the battery pack may have a cell-to-pack configuration where battery cells are arranged directly into a battery pack without assembly into a module. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, among others) and a thermoplastic material (e.g., polyethylene, polypropylene, polystyrene, polyvinyl chloride, or nylon), among others.

The battery cell 120 may include at least one anode layer 245, which may be disposed within the cavity 250 defined by the housing 230. The anode layer 245 may receive electrical current into the battery cell 120 and output electrons during the operation of the battery cell 120 (e.g., charging or discharging of the battery cell 120). The anode layer 245 may include an active substance.

The battery cell 120 may include at least one cathode layer 255 (e.g., a composite cathode layer compound cathode layer, a compound cathode, a composite cathode, or a cathode). The cathode layer 255 may be disposed within the cavity 250. The cathode layer 255 may output electrical current out from the battery cell 120 and may receive electrons during the discharging of the battery cell 120. The cathode layer 255 may also release lithium ions during the discharging of the battery cell 120. Conversely, the cathode layer 255 may receive electrical current into the battery cell 120 and may output electrons during the charging of the battery cell 120. The cathode layer 255 may receive lithium ions during the charging of the battery cell 120.

The battery cell 120 may include a polymer separator comprising a liquid electrolyte in the case of Li-ion batteries or a solid-state electrolyte layer 260 in the case of solid-state batteries, disposed within the cavity 250. The separator or solid-state electrolyte layer 260 may be arranged between the anode layer 245 and the cathode layer 255 to separate the anode layer 245 and the cathode layer 255. The liquid electrolyte or solid-state electrolyte layer 260 may transfer ions between the anode layer 245 and the cathode layer 255. The liquid or solid electrolytes can transfer cations (e.g., Li+ ions) from the anode layer 245 to the cathode layer 255 during a discharge operation of the battery cell 120. The liquid or solid electrolyte can transfer cations (e.g., Li+ ions) from the cathode layer 255 to the anode layer 245 during a charge operation of the battery cell 120.

FIG. 12 is an illustration of a prismatic battery cell 120. The prismatic battery cell 120 may have a housing 230 that defines a rigid enclosure. The housing 230 may have a polygonal base, such as a triangle, square, rectangle, pentagon, among others. For example, the housing 230 of the prismatic battery cell 120 may define a rectangular box. The prismatic battery cell 120 may include at least one anode layer 245, at least one cathode layer 255, and at least one separator and electrolyte or an electrolyte layer 260 disposed within the housing 230. The prismatic battery cell 120 may include a plurality of anode layers 245, cathode layers 255, and separator or electrolyte layers 260. For example, the layers 245, 255, 260 may be stacked or in a form of a flattened spiral. The prismatic battery cell 120 may include an anode tab 265. The anode tab 265 may contact the anode layer 245 and facilitate energy transfer between the prismatic battery cell 120 and an external component. For example, the anode tab 265 may exit the housing 230 or electrically couple with a positive terminal 235 to transfer energy between the prismatic battery cell 120 and an external component.

The battery cell 120 may also include a pressure vent 270. The pressure vent 270 may be disposed in the housing 230. The pressure vent 270 may provide pressure relief to the battery cell 120 as pressure increases within the battery cell 120. For example, gases may build up within the housing 230 of the battery cell 120. The pressure vent 270 may provide a path for the gases to exit the housing 230 when the pressure within the battery cell 120 reaches a threshold.

The present technology, thus generally described, will be understood more readily by reference to the following examples, which are provided by way of illustration and are not intended to be limiting of the present technology.

EXAMPLES

General. First-principles density functional theory (DFT)-based methodologies can be used to determine, understand, and pre-select MO (OH) compounds for coating materials. The DFT algorithms are used to calculate the thermodynamic stability of the materials, to identify those material shaving stable ground state structures vs. high-energy structures.

The screening strategy employed the following criteria to identify additional protective coating materials and compare them to AlO(OH) as an illustrative example of a coating material for separators. The criteria included: (a) stability/synthesizability; (b) electrical conductivity; (c) mechanical strength; (d) cathode stability by predicting an equilibrium or no reaction with illustrative cathode material LiFePO$_4$; (e) electrolyte stability by predicting an equilibrium or no reaction with HF, PF$_5^-$, LiF, and LiOH.

Figure 2:
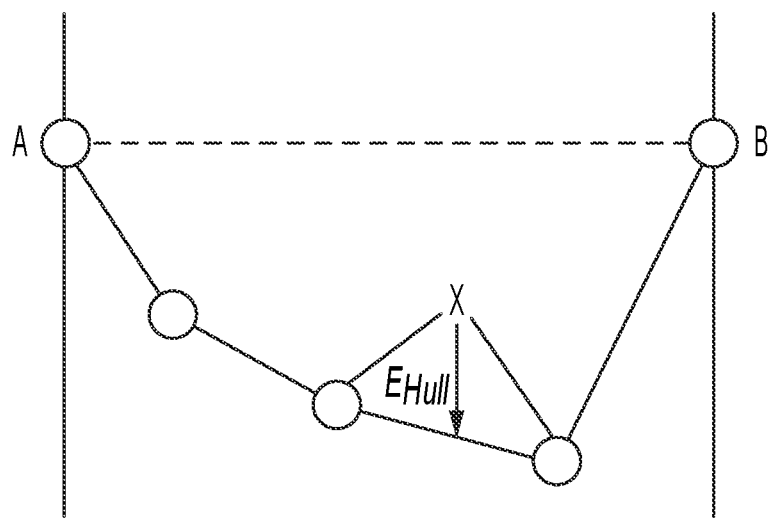
FIG. 2 shows a 2D representation of materials phase diagrams, where stable phases and two-phase equilibria in a phase diagram are represented as dots and tie-lines, respectively. The compound X is a "nearly stable" compound with a certain convex hull distance ($E_{hull}$).

Eight thermodynamically stable and four thermodynamically "nearly-stable" MO(OH) compounds were identified, as shown in Table 1 alongside AlO(OH). The thermodynamic stability is quantified based on the energy of the compound above the convex hull ($E_{hull}$) in the chemical space of elements which make up the material and such data are readily acquired from the materials project database. A compound with $E_{hull}=0$ lies in the energy convex hull, as illustrated in FIG. 2, and is a thermodynamically stable phase at T=0 K. A compound with $E_{hull}>0$ is thermodynamically metastable and a material with a high energy above hull (e.g., >50 meV/atom) may have a strong driving force to decomposition and would be difficult to synthesize experimentally. At room temperature k$_B$T=25 meV, and the kinetic energy of any given molecule at room temperature is ~36 meV/atom. Therefore, any compounds with $E_{hull}$ less than 36 meV/atom are thermodynamically "nearly-stable" compounds at room temperature conditions. As illustrated in Table 1, MnO(OH), CuO(OH), NiO(OH), and InO(OH) are thermodynamically "nearly-stable" compounds with a convex hull distance ($E_{hull}$). For example, NiO(OH) may decompose to Ni$_3$O$_4$, H$_2$O, and O$_2$, where the $E_{hull}$ is 29 meV/atom. However, "nearly-stable" compounds may be also stable at room temperature, since the difference between room temperature $k_BT$ and $E_{hull}$ for nearly stable compounds is similar to one another.

TABLE 1

Thermodynamic Stability of MO(OH) Compounds Alongside AlO(OH).

| Compound | Stability [meV/atom] |
|---|---|
| AlO(OH) | 0 (Stable) |
| ScO(OH) | 0 (Stable) |
| VO(OH) | 0 (Stable) |
| CrO(OH) | 0 (Stable) |
| FeO(OH) | 0 (Stable) |
| CoO(OH) | 0 (Stable) |
| GaO(OH) | 0 (Stable) |
| YO(OH) | 0 (Stable) |
| AgO(OH) | 0 (Stable) |
| MnO(OH) | 4 |
| NiO(OH) | 29 |
| CuO(OH) | 9 |
| InO(OH) | 3 |

Electrical conductivity was assessed by determining the bandgap ("$E_g$") for each MO(OH) compound, the results of which are illustrated in Table 2 below. As discussed earlier in this disclosure, ceramic coatings for a separator must show an insulating nature, where an excellent conductor has a bandgap of 0 eV, a semiconductor typically has a bandgap range of 0.5 eV to 1.5 eV, and an insulator has a larger bandgap such that electric current does not flow freely. As illustrated in Table 2, AgO(OH), NiO(OH), and CuO(OH) have a bandgap less than 1.5 eV, whereas the other MO(OH) compounds and AlO(OH) have bandgaps indicative of insulators. Moreover, ScO(OH) and YO(OH) have bandgaps greater than 4.4 eV, exceeding the normal cell operating voltage in Li-ion batteries (typically around 3-4 electron volts), which would be especially useful in preventing oxidation in the polymer sheet of the separator.

TABLE 2

Bandgaps of MO(OH) Compounds Alongside AlO(OH).

| Compound | $E_g$ (eV) |
|---|---|
| AlO(OH) | 5.287 |
| ScO(OH) | 4.426 |
| VO(OH) | ~1.7 |
| CrO(OH) | 3.059 |
| FeO(OH) | ~2.8 |
| CoO(OH) | 2.148 |
| GaO(OH) | 3.257 |
| YO(OH) | 4.407 |
| AgO(OH) | ~0.4 |
| MnO(OH) | 1.741 |
| NiO(OH) | 0.083 |
| CuO(OH) | 0.606 |
| InO(OH) | 1.776 |

Below, Table 3 shows the intrinsic density of the MO(OH) compounds, ranging from 2.99 to 5.91 g/cm³. Notably, ScO(OH) has similar density as AlO(OH). In general, as density increases porosity decreases. Porosity as used herein describes the pore volume fractions in a total volume of material as determined by mercury porosimetry. However, in the case of coated separators, the porosity of the porous polymer sheet is typically less than the porosity of ceramic coatings. Thus, while the intrinsic MO(OH) density may vary from 2.99 g/cm³ to 5.91 g/cm³, the intrinsic MO(OH) density may not have significant impact on the overall porosity of coated separator. At the same time, smaller pore size in coating layer can improve insulation, where the chemical coating process may play more important role to yield more dense ceramic coating layers. The particular coating process, usage of organic vs. water-based solvents, and/or incorporation of secondary materials may be utilized to further help control the porosity of the coated separator.

TABLE 3

MO(OH) intrinsic densities.

| Compound | Intrinsic Density (g/cm³) |
|---|---|
| AlO(OH) | 3.00 |
| ScO(OH) | 2.99 |
| VO(OH) | 3.80 |
| CrO(OH) | 3.87 |
| FeO(OH) | 4.14 |
| CoO(OH) | 4.88 |
| GaO(OH) | 4.99 |
| YO(OH) | 4.46 |
| AgO(OH) | 4.22 |
| MnO(OH) | 3.96 |
| NiO(OH) | 4.53 |
| CuO(OH) | 4.37 |
| InO(OH) | 5.91 |

The mechanical strength of a separator is dependent on the porous polymer sheet. Table 4 compares the bulk modulus and shear modulus of MO(OH) compounds against AlO(OH), where "Bulk Modulus vs. AlO(OH)" is ([MO(OH) Bulk Modulus]/[AlO(OH) Bulk Modulus])×100% and "Shear Modulus vs. AlO(OH)" is ([MO(OH) Shear Modulus]/[AlO(OH) Bulk Modulus])×100%. The bulk modulus of a substance is a measure of the substance's resistance to compression; the shear modulus describes the response to shear stress, i.e., a measure of the elastic shear stiffness of a material and is defined as the ratio of shear stress to the shear strain. Table 4 shows that except for ScO(OH), the identified MO(OH) compounds bulk modulus values are comparable or greater than AlO(OH) and AlO(OH) has the highest shear modulus, i.e., highest resistance against shear stress.

TABLE 4

Bulk and shear modulus of MO(OH) compounds.

| Materials | Bulk Modulus (GPa) | Bulk Modulus vs. AlO(OH) (%) | Shear Modulus (GPa) | Shear Modulus vs. AlO(OH) (%) |
|---|---|---|---|---|
| AlO(OH) | 114 | 100 | 82 | 100 |
| ScO(OH) | 78 | 68.4 | 49 | 59.8 |
| VO(OH) | 144.17 | 126.5 | 60.74 | 74.1 |
| CrO(OH) | 134.38 | 117.9 | 52.17 | 63.6 |
| FeO(OH) | 131.14 | 115.0 | 48.89 | 59.6 |
| CoO(OH) | 155.78 | 136.6 | 57.45 | 70.1 |
| GaO(OH) | 147.47 | 129.4 | 58.12 | 70.9 |
| YO(OH) | 132.79 | 116.5 | 63.64 | 77.6 |
| MnO(OH) | 127.15 | 111.5 | 47.53 | 58.0 |
| InO(OH) | 124.87 | 109.5 | 40.94 | 49.9 |

As noted previously, another screening step included cathode stability as assessed by predicting an equilibrium or no reaction with illustrative cathode material LiFePO$_4$. This screening step takes into consideration battery designs where the cathode materials may be in contact with the coatings in the coated separators. It is preferred that either no reaction is found, or if there is a reaction it is at equilibrium so that overall compositional changes are not imparted to the electrode. To compute whether a compound exhibits equilibrium with the electrode materials, the convex hull method was used. For each candidate compound, the convex hull is calculated for the set of elements defined by the compound plus the $LiFePO_4$ to determine the most stable reaction between the MO(OH) compound and $LiFePO_4$. For example, for CrO(OH) the most energetically favorable chemical reaction with $LiFePO_4$ is:

$$0.6\ LiFePO_4 + 0.4\ CrHO_2 \rightarrow 0.2\ LiH + 0.2\ FeH + 0.1\ Li_4CrFe_3O_8 + 0.1\ Cr_3Fe(PO_4)_6$$

This reaction has a $E_{rxn}$ value of $-1.598$ eV/atom. The results for the identified MO(OH) compounds and AlO(OH) are provided below in Table 5.

TABLE 5

Stability with $LiFePO_4$.

| Compound | Reaction with $LiFePO_4$ | $E_{rxn}$ (eV/atom) |
|---|---|---|
| AlO(OH) | Stable (no reaction) | N/A |
| ScO(OH) | Stable (no reaction) | N/A |
| VO(OH) | Stable (no reaction) | N/A |
| CrO(OH) | $0.6LiFePO_4 + 0.4CrHO_2 \rightarrow 0.2LiH + 0.2FeH + 0.1Li_4CrFe_3O_8 + 0.1Cr_3Fe(PO_4)_6$ | $-1.598$ |
| FeO(OH) | Stable (no reaction) | N/A |
| CoO(OH) | $0.5\ LiFePO_4 + 0.5\ CoHO_2 \rightarrow 0.5\ LiCoPO_4 + 0.5\ FeO(OH)$ | $-0.042$ |
| GaO(OH) | Stable (no reaction) | N/A |
| YO(OH) | $0.4\ YHO_2 + 0.6\ LiFePO_4 \rightarrow 0.6\ FeO + 0.4\ YPO_4 + 0.2\ Li_3PO_4 + 0.2\ H_2O$ | $-0.023$ |
| MnO(OH) | $0.5\ LiFePO_4 + 0.5\ MnHO_2 \rightarrow 0.5\ FeO(OH) + 0.5\ LiMnPO_4$ | $-0.030$ |
| InO(OH) | Stable (no reaction) | N/A |

As illustrated in Table 5, CrO(OH) reacts with $LiFePO_4$ very favorably (i.e., with a very negative $E_{rxn}$ value). While not as favorable as CrO(OH), YO(OH) reacts with $LiFePO_4$ to produce $H_2O$ (which can further trigger the formation of HF) and CoO(OH) and MnO(OH) each react with $LiFePO_4$ to form $LiCoPO_4$ or $LiMnPO_4$ at the interface along with FeO(OH).

HF can form in the liquid electrolyte when residual water/moisture is present to react with $LiPF_6$ salt in the battery cell: $LiPF_6+H_2O \leftrightarrow POF_3+2HF+LiF$. HF is an acid that can degrade subcomponents in battery cell. Therefore, it would be beneficial for a coating to be relatively stable against HF and, when there is a reaction, no concerning products are produced by reaction of HF with the coating thus allowing the coating to scavenge HF. Because AlO(OH) is considered a relatively stable compound with respect to HF, the HF reactivity was determined for identified MO(OH) compounds and then normalized to the case of AlO(OH). The results are provided in Table 6, where the "Ratio" is the ratio of moles HF to compound (e.g., HF:AlO(OH) is 0.75:0.25=3), where the compounds are normalized vs. AlO(OH) in the "Ratio vs. AlO(OH)" column. An example is FeO(OH), where HF: FeO(OH)=5, and the "Ratio vs. AlO(OH)" is ⅗=60%. It is beneficial when the "Ratio vs. AlO(OH)" is less than 100% (i.e., more reactive against HF than AlO(OH)). Another criteria is the reaction enthalpy. When AlO(OH) reacts with HF, the corresponding reaction enthalpy ($E_{rxn}$) is found to be $-0.242$ eV/atom. The reaction enthalpy for the MO(OH) compounds was normalized vs. AlO(OH) ("$E_{rxn}$ vs. AlO(OH)"), where for HF scavenging it is beneficial when this value is less than 100% (i.e., HF scavenging reaction is more favorable). The two values that are referenced to AlO(OH) for molar ratio and reaction enthalpy are then added ("Sum"). Since these values are evaluated based on the molar fraction, it is then converted by dividing by molecular weight: e.g., 200/59.99×1,000=33.33 for AlO(OH). Lastly, the "HF score" provides the improvement vs. AlO(OH) for all materials (e.g., 33.33/23.68×100=140.75% for ScO(OH). As illustrated in the "Reaction with HF" column of Table 6, CoO(OH) releases $O_2$ gas upon reaction with HF, which can be a concern in terms of cell safety; AlO(OH), ScO(OH), and VO(OH) generate $H_2O$, where $H_2O$ is known to react with $LiPF_6$ which would produce another HF molecule, and GaO(OH), FeO(OH), MnO(OH), and InO(OH) do not produce $H_2O$ as byproduct when reacting with HF.

TABLE 6

HF stability

| Compound | Reaction with HF | Ratio | Ratio vs. AlO(OH) | $E_{rxn}$ (eV/atom) | $E_{rxn}$ vs. AlO(OH) | Sum | HF Score |
|---|---|---|---|---|---|---|---|
| AlO(OH) | $0.75\ HF + 0.25\ AlHO_2 \rightarrow 0.25\ AlF_3 + 0.5\ H_2O$ | 3 | 100% (Ref.) | $-0.242$ | 100% (Ref.) | 200.0% (Ref.) | 100.00% |
| ScO(OH) | $0.75\ HF + 0.25\ ScHO_2 \rightarrow 0.25\ ScF_3 + 0.5\ H_2O$ | 3 | 100% | $-0.286$ | 84.6% | 184.6% | 140.75% |
| VO(OH) | $0.75\ HF + 0.25\ ScHO_2 \rightarrow 0.25\ ScF_3 + 0.5\ H_2O$ | 3 | 100% | $-0.220$ | 110% | 210.0% | 133.27% |
| FeO(OH) | $0.833\ HF + 0.167\ FeHO_2 \rightarrow 0.333\ H_3OF + 0.167\ FeF_3$ | 5 | 60% | $-0.199$ | 121.6% | 181.6% | 163.06% |
| COO(OH) | $0.778\ HF + 0.222\ CoHO_2 \rightarrow 0.333\ H_3OF + 0.222\ CoF_2 + 0.056\ O_2$ | 3.5 | 85.7% | $-0.135$ | 179.3% | 265.0% | 115.65% |
| GaO(OH) | $0.833\ HF + 0.167\ GaHO_2 \rightarrow 0.333\ H_3OF + 0.167\ GaF_3$ | 5 | 60% | $-0.182$ | 133.0% | 193.0% | 177.38% |
| MnO(OH) | $0.833\ HF + 0.167\ MnHO_2 \rightarrow 0.333\ H_3OF + 0.167\ MnF$ | 5 | 60% | $-0.183$ | 132.2% | 192.2% | 152.54% |
| InO(OH) | $0.833\ HF + 0.167\ InHO_2 \rightarrow 0.333\ H_3OF + 0.167\ InF_3$ | 5 | 60% | $-0.203$ | 119.2% | 179.2% | 275.00% |

$PF_5^-$ is a species that forms from $LiPF_6$ salt decomposition: $LiPF_6 \leftrightarrow LiF+PF_5^-$. Similar to HF, $PF_5^-$ will decompose battery subcomponents. Thus, similar to the determination of HF reactivity, the $PF_5^-$ reactivity for MO(OH) candidates was determined and this was then normalized to the case of AlO(OH) to provide a "$PF_5$ score," where the results are provided in Table 7.

TABLE 7

$PF_5^-$ reactivity.

| Materials | $PF_5^-$ reactions | Ratio | Ratio vs. AlO(OH) | $E_{rxn}$ (eV/atom) | $E_{rxn}$ vs. AlO(OH) | Sum | $PF_5$ Score |
|---|---|---|---|---|---|---|---|
| AlO(OH) | 0.333 $PF_5$ + 0.667 $AlHO_2$ → 0.222 $PH_3O_4$ + 0.556 $AlF_3$ + 0.111 $AlPO_4$ | 0.5 | 100% | −0.241 | 100.0% | 200.0% | 100.00% |
| ScO(OH) | 0.357 $PF_5$ + 0.643 $ScHO_2$ → 0.214 $PH_3O_4$ + 0.048 $Sc(PO_3)_3$ + 0.595 $ScF_3$ | 0.56 | 89.3% | −0.301 | 80.1% | 169.4% | 153.24% |
| VO(OH) | 0.333 $PF_5$ + 0.667 $VHO_2$ → 0.222 $PH_3O_4$ + 0.111 $VPO_4$ + 0.556 $VF_3$ | 0.5 | 100% | −0.196 | 123.0% | 223.0% | 125.38% |
| FeO(OH) | 0.357 $PF_5$ + 0.643 $FeHO_2$ → 0.048 $Fe_2P_3(O_3F)_3$ + 0.214 $PH_3O_4$ + 0.548 $FeF_3$ | 0.56 | 89.3% | −0.172 | 140.1% | 229.4% | 128.97% |
| GaO(OH) | 0.294 $PF_5$ + 0.706 $GaHO_2$ → 0.235 $H_3OF$ + 0.294 $GaPO_4$ + 0.412 $GaF_3$ | 0.46 | 108.7% | −0.150 | 160.7% | 269.4% | 127.00% |
| MnO(OH) | 0.278 $PF_5$ + 0.722 $MnHO_2$ → 0.444 $MnF_3$ + 0.278 $MnPH_2O_5$ + 0.056 $H_3OF$ | 0.39 | 128.2% | −0.150 | 160.7% | 288.9% | 101.37% |
| InO(OH) | 0.333 $PF_5$ + 0.667 $InHO_2$ → 0.111 $InPO_4$ + 0.556 $InF_3$ + 0.222 $PH_3O_4$ | 0.5 | 100% | −0.177 | 136.2% | 236.2% | 208.39% |

Electrolyte decomposition leads to the formation of the desirable solid electrolyte interface (SEI). The SEI is primarily composed of LiF, $Li_2O$, $Li_2CO_3$ and other insoluble products. Enriching the SEI with LiF has recently gained popularity to improve Li cyclability. Since SEI forms at the electrode surface, it will be in contact with ceramic coating materials in separators. Here, it is desirable that the coatings not to consume LiF, so that it remains available for the SEI formation. Similar to the determination of HF reactivity and $PF_5^-$ reactivity discussed above, the LiF reactivity for MO(OH) compounds was determined and the results are provided in Table 8. As illustrated in Table 8, the indicated MO(OH) candidates do not react with LiF, and therefore should form a stable interface when in contact with SEI formed at the cell electrodes (the cathode, the anode, or both for separators coated on both surfaces) without further decomposition.

LiOH may also be present at the surface of cathode materials, depending on the choice of Li salt precursors. The presence of LiOH leads to the formation of $H_2O$ within the cell, and this can subsequently form HF. Similar to LiF, it is desirable that the LiOH reaction not take place when in contact with the Li-M-P—O compounds, to avoid the $H_2O$ formation. Similar to the determination of HF reactivity and $PF_5^-$ reactivity discussed above, the LiOH reactivity for MO(OH) compounds was determined then normalized to the case of AlO(OH) to ultimately provide a "LiOH score," as indicated in Table 9.

TABLE 8

LiF stability.

| Compound | Reaction with LiF |
|---|---|
| AlO(OH) | Stable (does not react) |
| ScO(OH) | Stable (does not react) |
| VO(OH) | Stable (does not react) |
| FeO(OH) | Stable (does not react) |
| GaO(OH) | Stable (does not react) |
| MnO(OH) | Stable (does not react) |
| InO(OH) | Stable (does not react) |

TABLE 9

LiOH stability

| Materials | LiOH reactions | Ratio | Ratio vs. AlO(OH) | $E_{rxn}$ [eV/atom] | $E_{rxn}$ vs. AlO(OH) | Sum | LiOH Score |
|---|---|---|---|---|---|---|---|
| AlO(OH) | 0.5 $AlHO_2$ + 0.5 LiHO → 0.5 $LiAlO_2$ + 0.5 $H_2O$ | 1 | 100% | −0.030 | 100% | 200% | 100.00% |
| ScO(OH) | Does not react (Stable) | | | | | | N/A |

TABLE 9-continued

LiOH stability

| Materials | LiOH reactions | Ratio | Ratio vs. AlO(OH) | $E_{rxn}$ [eV/atom] | $E_{rxn}$ vs. AlO(OH) | Sum | LiOH Score |
|---|---|---|---|---|---|---|---|
| VO(OH) | 0.5 LiHO + 0.5 VHO$_2$ → 0.5 LiVO$_2$ + 0.5 H$_2$O | 1 | 100% | −0.017 | 176.4% | 276.4% | (Infinite) 101.15% |
| FeO(OH) | 0.5 LiHO + 0.5 FeHO$_2$ → 0.5 LiFeO$_2$ + 0.5 H$_2$O | 1 | 100% | −0.006 | 500 % | 600% | 49.32% |
| GaO(OH) | 0.5 LiHO + 0.5 GaHO$_2$ → 0.5 LiGaO$_2$ + 0.5 H$_2$O | 1 | 100% | −0.054 | 55.6% | 155.6% | 219.80% |
| MnO(OH) | 0.5 LiHO + 0.5 MnHO$_2$ → 0.5 LiMnO$_2$ + 0.5 H$_2$O | 1 | 100% | −0.023 | 130.4% | 230.4% | 127.10% |
| InO(OH) | Does not react (Stable) | | | | | | N/A (Infinite) |

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or devices, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A coated separator comprising:
   a porous polymer sheet comprising a surface;
   a coating disposed on the surface, the coating comprising
      a metal oxyhydroxide comprising ScO(OH) or VO(OH) or a mixture thereof;
      the coating comprises:
         an HF score greater than that of AlO(OH) where the HF score of AlO(OH) is normalized at 100%;
         a $PF_5^-$ score greater than when normalized to that of AlO(OH) where the $PF_5^-$ score of AlO(OH) is normalized at 100%; or
         a LiOH score greater than that of AlO(OH) where the LiOH score of AlO(OH) is normalized at 100%; or
         a combination of any two or more thereof.

2. The coated separator of claim 1, wherein the metal oxyhydroxide comprises ScO(OH).

3. The coated separator of claim 1, wherein the coating further comprises SiO$_2$, Al$_2$O$_3$, or AlO(OH), or a mixture of any two or more thereof.

4. The coated separator of claim 1, wherein the coating comprises:
   a first layer comprising SiO$_2$, Al$_2$O$_3$, or AlO(OH), or a mixture of any two or more thereof; and a second layer comprising the ScO(OH) or VO(OH), or a mixture thereof.

5. The coated separator of claim 1, wherein the porous polymer sheet comprises cellulose, polyethylene, or polypropylene, or a combination of any two or more thereof.

6. The coated separator of claim 1, wherein:
the surface is a first surface of the porous polymer sheet, the porous polymer sheet comprising the first surface and a second surface opposite the first surface; and
the coated separator further comprises a second coating disposed on the second surface of the porous polymer sheet, the second coating comprising a metal oxyhydroxide.

7. The coated separator of claim 1, wherein:
the surface is a first surface of the porous polymer sheet, the porous polymer sheet comprising the first surface and a second surface opposite the first surface; and
the porous polymer sheet comprises a thickness between the first surface and the second surface of about 3 µm to about 40 µm.

8. The coated separator of claim 1, wherein the porous polymer sheet comprises a porosity as determined by mercury porosimetry of about 30% to about 80%.

9. The coated separator of claim 1, wherein the porous polymer sheet comprises pore sizes as determined by mercury porosimetry of about 20 nm to about 80 nm.

10. The coated separator of claim 1, wherein the porous polymer sheet comprises a machine direction tensile strength of about 1,000 kgf/cm$^2$ to about 2,500 kgf/cm$^2$.

11. The coated separator of claim 1, wherein the coating comprises an average thickness of about 0.1 µm to about 15 µm.

12. The coated separator of claim 1, wherein the coating is a ceramic coating.

13. A lithium ion battery comprising:
a cathode comprising a cathode active material; and
a coated separator;
wherein:
the coated separator comprises:
a porous polymer sheet comprising a surface;
a coating disposed on the surface, the coating comprising a metal oxyhydroxide comprising ScO(OH) or VO(OH) or a mixture thereof; and
the coating comprises:
an HF score greater than that of AlO(OH) where the HF score of AlO(OH) is normalized at 100%;
a PF$_5^-$ score greater than when normalized to that of AlO(OH) where the PF$_5^-$ score of AlO(OH) is normalized at 100%; or
a LiOH score greater than when normalized to that of AlO(OH) where the LiOH score of AlO(OH) is normalized at 100%; or
a combination of any two or more thereof.

14. The lithium ion battery of claim 13, wherein the metal oxyhydroxide comprises the ScO(OH), VO(OH).

15. The lithium ion battery of claim 13, wherein the cathode comprises LiFePO$_4$, LiMn$_{1-x}$FePO$_4$, LiM$^1$O$_2$, or Li$_{1+x}$M$^2_{1-x}$O$_2$, or a mixture of any two or more thereof, where independently at each occurrence 0≤x≤1 and M$^1$ and M$^2$ are each independently Ni, Co, Mn, or Al.

16. The lithium ion battery of claim 13, wherein the coating is between the porous polymer sheet and the cathode.

17. The lithium ion battery of claim 13, wherein the metal oxyhydroxide comprises VO(OH).

18. A process of manufacturing a coated separator for a lithium ion battery, the process comprising:
mixing a metal oxyhydroxide comprising ScO(OH) or VO(OH) or a mixture thereof and optionally a binder in a solvent to form a slurry;
coating the slurry onto a surface of a porous polymer sheet; and
removing the solvent to provide the coated separator, the coated separator comprising a coating disposed on the surface of the porous polymer sheet;
wherein:
the coating comprises:
an HF score greater than that of AlO(OH) where the HF score of AlO(OH) is normalized at 100%;
a PF$_5^-$ score greater than when normalized to that of AlO(OH) where the PF$_5^-$ score of AlO(OH) is normalized at 100%; or
a LiOH score greater than that of AlO(OH) where the LiOH score of AlO(OH) is normalized at 100%; or
a combination of any two or more thereof.

19. The process of claim 18, wherein the metal oxyhydroxide comprises VO(OH).

20. The process of claim 18, wherein the metal oxyhydroxide comprises ScO(OH).

* * * * *